(12) United States Patent
Ogawa

(10) Patent No.: US 7,540,505 B2
(45) Date of Patent: Jun. 2, 2009

(54) STABILIZER SYSTEM

(75) Inventor: Atsushi Ogawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 375 days.

(21) Appl. No.: 10/498,525

(22) PCT Filed: Feb. 4, 2003

(86) PCT No.: PCT/JP03/01144

§ 371 (c)(1),
(2), (4) Date: Jun. 14, 2004

(87) PCT Pub. No.: WO03/066356

PCT Pub. Date: Aug. 14, 2003

(65) Prior Publication Data

US 2005/0077696 A1    Apr. 14, 2005

(30) Foreign Application Priority Data

Feb. 6, 2002    (JP)    .............................. 2002-029738

(51) Int. Cl.
*B60G 17/005*    (2006.01)

(52) U.S. Cl. .............................. 280/5.502; 280/124.152; 280/5.511

(58) Field of Classification Search .......... 280/124.157, 280/124.152, 124.106, 5.501, 5.502, 5.51, 280/5.511, 5.512, 5.519
See application file for complete search history.

(56) References Cited

U.S. PATENT DOCUMENTS

| | | | | |
|---|---|---|---|---|
| 4,526,401 A | * | 7/1985 | Kakizaki et al. | 188/266.8 |
| 4,589,678 A | * | 5/1986 | Lund | 280/5.511 |
| 4,844,506 A | * | 7/1989 | Moriguchi et al. | 280/5.51 |
| 4,886,291 A | * | 12/1989 | Okamoto | 280/5.501 |
| 4,903,983 A | * | 2/1990 | Fukushima et al. | 280/5.503 |
| 4,919,444 A | * | 4/1990 | Leiber et al. | 280/5.511 |
| 5,075,855 A | * | 12/1991 | Sugasawa et al. | 701/37 |
| 5,217,245 A | * | 6/1993 | Guy | 280/124.152 |
| 5,687,960 A | * | 11/1997 | Moon | 267/273 |
| 5,803,482 A | * | 9/1998 | Kim | 280/124.157 |
| 6,179,310 B1 | * | 1/2001 | Clare et al. | 280/124.159 |
| 6,357,771 B1 | * | 3/2002 | Clements et al. | 280/124.13 |

(Continued)

FOREIGN PATENT DOCUMENTS

JP    U 61-190708    11/1986

(Continued)

*Primary Examiner*—John Q. Nguyen
*Assistant Examiner*—Timothy Wilhelm
(74) *Attorney, Agent, or Firm*—Oliff & Berridge, PLC

(57) ABSTRACT

A stabilizer system including stabilizer control portions which change respective elastic forces of front-wheel-side and rear-wheel-side stabilizer bars. When an abnormality occurs to one of the stabilizer control portions, the other control portion is controlled according to a changed control rule corresponding to the abnormality. In the case where the front-wheel-side stabilizer control portion 20 is abnormally fixed to a damping-force producing mode, the rear-wheel-side stabilizer control portion 22 is controlled to the damping-force producing mode. In the case where the front-wheel-side stabilizer control portion 20 is abnormally fixed to an elastic-force producing mode, the rear-wheel-side stabilizer control portion 22 is controlled according to a normal control rule. Since the control rule is changed according to the nature of the abnormality, the vehicle can enjoy improved running stability.

17 Claims, 8 Drawing Sheets

U.S. PATENT DOCUMENTS

| | | | |
|---|---|---|---|
| 6,519,517 B1 * | 2/2003 | Heyring et al. | 701/37 |
| 6,530,586 B2 * | 3/2003 | Fader et al. | 280/124.106 |
| 6,951,341 B1 * | 10/2005 | Beetz et al. | 280/5.511 |
| 2002/0130481 A1 * | 9/2002 | Fader et al. | 280/124.137 |
| 2003/0111806 A1 * | 6/2003 | Carlstedt et al. | 280/5.511 |

FOREIGN PATENT DOCUMENTS

| | | |
|---|---|---|
| JP | A 2-303918 | 12/1990 |
| JP | U 3-17912 | 2/1991 |
| JP | B2 3-16282 | 3/1991 |
| JP | A 4-191115 | 7/1992 |
| JP | A 7-242115 | 9/1995 |
| JP | B2 7-88136 | 9/1995 |
| JP | B2 2517983 | 5/1996 |
| JP | A 8-142893 | 6/1996 |
| JP | B2 2981106 | 9/1999 |
| JP | A 2000-71737 | 3/2000 |
| JP | A 2000-71739 | 3/2000 |
| JP | A 2000-289427 | 10/2000 |
| JP | A 2001-105827 | 4/2001 |

* cited by examiner

FIG.3

IN-NORMALITY CONTROL TABLE

|  | $\|Gy\| < Gy_1$ | $Gy_1 \leq \|Gy\| < Gy_2$ | $Gy_2 \leq \|Gy\| < Gy_3$ | $\|Gy\| \geq Gy_3$ |
|---|---|---|---|---|
| $\dfrac{d\|\theta\|}{dt} > 0$ | F/F | F/L | L/L | L/F |
| $\dfrac{d\|\theta\|}{dt} \leq 0$ | F/F | L/F | L/L (L/F) | L/F |

DAMPING-FORCE PRODUCING MODE:F
ELASTIC-FORCE PRODUCING MODE:L

FIG.4

IN-ABNORMALITY CONTROL TABLE

| FAILURE | NORMAL STABILIZER CONTROL PORTION |
|---|---|
| FIXING TO F OF FRONT-WHEEL-SIDE STABILIZER CONTROL PORTION | FIXING TO F OF REAR-WHEEL-SIDE STABILIZER CONTROL PORTION (F/F) |
| FIXING TO F OF REAR-WHEEL-SIDE STABILIZER CONTROL PORTION | NORMAL CONTROL OF FRONT-WHEEL-SIDE STABILIZER CONTROL PORTION (CONTROL/F) |
| FIXING TO L OF FRONT-WHEEL-SIDE STABILIZER CONTROL PORTION | NORMAL CONTROL OF REAR-WHEEL-SIDE STABILIZER CONTROL PORTION (L/CONTROL) |
| FIXING TO L OF REAR-WHEEL-SIDE STABILIZER CONTROL PORTION | FIXING TO L OF FRONT-WHEEL-SIDE STABILIZER CONTROL PORTION (L/L) |

US 7,540,505 B2

STABILIZER SYSTEM

TECHNICAL FIELD

The present invention relates to a stabilizer system including a stabilizer bar, and a stabilizer control portion which corresponds to the stabilizer bar and is controllable based on a running condition of a vehicle to control an elastic force of the stabilizer bar.

BACKGROUND ART

An example of the above-indicated stabilizer system is disclosed by Japanese Patent No. 2517983. In the stabilizer system disclosed by this publication, if an abnormality occurs to a stabilizer control portion of the system, the stabilizer control portion is not controlled any longer.

DISCLOSURE OF THE INVENTION

It is an object of the present invention to provide a stabilizer system including a stabilizer control portion which can be controlled even if the stabilizer system may be brought into an unusual, special state. This object may be achieved according to any of the following modes of the present invention in the form of a stabilizer system, each of which is numbered like the appended claims and may depend from the other mode or modes, where appropriate, to indicate and clarify possible combinations of technical features. It is, however, to be understood that the present invention is not limited to the technical features or any combinations thereof that will be described below for illustrative purposes only. It is to be further understood that a plurality of features included in any one of the following modes of the invention are not necessarily provided altogether, and that the invention may be embodied without at least one of the features described with respect to each of the modes.

(1) A stabilizer system comprising a stabilizer bar, and a stabilizer control portion which corresponds to the stabilizer bar and is controllable, based on a running condition of a vehicle, to control an elastic force of the stabilizer bar, the stabilizer system being characterized by further comprising a control-rule changing portion which changes, when the stabilizer system is brought into an unusual, special state, a control rule according to which the stabilizer control portion is controlled.

According to this mode, when the stabilizer system is brought into the unusual special state, the control rule according to which the stabilizer control portion is controlled is changed.

The unusual special state of the stabilizer system is, for example, a state in which the stabilizer control portion is abnormal, or a state in which an unusually (i.e., rarely) great force is exerted to the stabilizer bar.

However, in the unusual special state of the stabilizer system, the control rule may not be changed. According to this mode, the control rule may be changed if the special state has a predetermined nature, and may not be changed if the special state has a different nature.

The stabilizer control portion is controllable, based on the running condition of the vehicle, to control the elastic force of the stabilizer bar. For example, when the vehicle is turning, the stabilizer control portion may be controlled to make the elastic force of the stabilizer bar greater than when the vehicle is running straight; and when the vehicle is running on a bad road, the stabilizer control portion may be controlled to make the elastic force of the stabilizer bar smaller than when the vehicle is running on a good road.

(2) The stabilizer system according to the mode (1), wherein the control-rule changing portion comprises a special-state identifying portion which identifies the special state of the stabilizer system; and a special-state-related changing portion which changes the control rule such that the changed control rule corresponds to the special state identified by the special-state identifying portion.

According to this mode, the control rule is changed such that the changed control rule corresponds to the nature of the special state. According to this mode, the control rule may, or may not, be changed depending upon the nature of the special state; or the control rule may be changed to different control rules respectively corresponding to different natures of the special state.

The nature of the unusual special state is, for example, a sort, or a degree, of abnormality of the stabilizer control portion, or a magnitude of a force exerted to the stabilizer bar.

The sort of abnormality of the stabilizer control portion is, for example, (a) an abnormality of an electric system of the stabilizer control portion, (b) an abnormal leakage of a working liquid from a hydraulic cylinder device, or an abnormal fixing of a piston of the cylinder device, in the case where the cylinder device is employed by the stabilizer control portion, or (c) an abnormal fixing of the stabilizer control portion to an elastic-force producing mode in which the stabilizer control portion causes the stabilizer bar to produce the elastic force in response to a relative movement of a left wheel and a right wheel of the vehicle in a vertical direction, an abnormal fixing of the stabilizer control portion to a damping-force producing mode in which the stabilizer control portion produces a damping force in response to a relative movement of a left wheel and a right wheel of the vehicle in a vertical direction, or an abnormal fixing of the stabilizer control portion to a relative-movement allowing mode in which the stabilizer control portion allows a free relative movement of a left wheel and a right wheel of the vehicle in a vertical direction, in the case where the stabilizer control portion is switchable to the elastic-force producing mode, the damping-force producing mode, and the relative-movement allowing mode.

The degree of abnormality of the stabilizer control portion is, for example, an amount of leakage of the working liquid from the hydraulic cylinder device (e.g., a small or great amount of leakage of the working liquid, in other words, whether the hydraulic cylinder device is operable or inoperable), or a degree of abnormality of the electric system {e.g., no electric current can be supplied to the stabilizer control portion, or an electric current can be supplied to only a portion of resistors (i.e., power consuming portions) of the stabilizer control portion}. In addition, the magnitude of the force exerted to the stabilizer bar may be whether the force is greater than a pre-set value corresponding to an allowable stress of the stabilizer bar.

(3) The stabilizer system according to the mode (1) or (2), wherein the control-rule changing portion comprises a force-related changing portion which changes, when a force exerted to the stabilizer bar exceeds a pre-set value that is unusually great, the control rule that has been used before the force exceeds the pre-set value.

For example, when the force exerted to the stabilizer bar exceeds the pre-set value, the control rule is changed to a different control rule according to which the stabilizer control portion is controlled to cause the stabilizer bar to receive a reduced force.

(4) The stabilizer system according to any of the modes (1) to (3), wherein the control-rule changing portion comprises an elastic-force decreasing portion which changes, when a force exerted to the stabilizer bar exceeds a pre-set value, the control rule such that according to the changed control rule, the stabilizer control portion is controlled, independent of the running condition of the vehicle, to decrease the elastic force of the stabilizer bar such that the decreased elastic force is smaller than the elastic force when the force exceeds the pre-set value.

In the stabilizer system according to this mode, when the force exerted to the stabilizer bar exceeds the pre-set value, the elastic force of the stabilizer bar is decreased. Thus, the stress of the stabilizer bar can be prevented from being excessively increased.

(5) The stabilizer system according to the mode (3) or (4), wherein the control-rule changing portion further comprises a force detecting portion which detects the force exerted to the stabilizer bar.

The force exerted to the stabilizer bar may detected either directly or indirectly. For example, in the case where the stabilizer bar is provided with a load sensor, the force exerted to the stabilizer bar may be detected based on a load detected by the load sensor; or in the case where a hydraulic cylinder device is provided in an intermediate portion of the stabilizer bar, or in the case where a hydraulic cylinder device is provided between the stabilizer bar and a wheel-side member, the force may be detected based on a liquid pressure in a liquid chamber of the cylinder device. At any rate, if a physical quality that can be used to estimate a force, or a physical quantity, equivalent to the force exerted to the stabilizer bar, is detected, the force exerted to the stabilizer bar can be obtained. The load sensor may be of a type that detects the force exerted to the stabilizer bar, based on a strain of the stabilizer bar.

More specifically described, in the case where the stabilizer control portion is selectively switchable to the above-described elastic-force producing mode, damping force producing mode, and relative-movement allowing mode, and the control rule is such that based on the running condition of the vehicle, the stabilizer control portion is selectively switched to one of the three modes, the control rule may be changed, when the force exerted to the stabilizer bar exceeds the pre-set value, to a different control rule according to which the stabilizer control portion is selectively switched to one of the two modes, i.e., the damping force producing mode and the relative-movement allowing mode (i.e., the stabilizer control portion is inhibited from being switched to the elastic-force producing mode). Since the stabilizer control portion is not switched any longer to the elastic-force producing mode, the force exerted to the stabilizer bar is prevented from being excessively increased.

(6) The stabilizer system according to any of the modes (1) to (5), wherein the stabilizer system comprises a plurality of stabilizer control portions, and wherein the control-rule changing portion comprises an abnormality-related changing portion which changes, when an abnormality occurs to one of the stabilizer control portions, a control rule or rules according to which the other stabilizer control portion or portions than the one stabilizer control portion is or are controlled, such that the changed control rule or rules corresponds or correspond to the abnormality.

In the stabilizer system according to this mode, the plurality of stabilizer control portions are employed, for example, two stabilizer control portions are employed for a stabilizer bar corresponding to front wheels and a stabilizer bar corresponding to rear wheels, respectively.

In the case where an abnormality occurs to one of the front-wheel-side stabilizer control portion and the rear-wheel-side stabilizer control portion, the one stabilizer control portion cannot any longer control the elastic force of a corresponding one of the stabilizer bars. However, the other stabilizer control portion can control the elastic force of the other stabilizer bar. In this case, if the elastic force of the other stabilizer bar is controlled according to the same control rule, irrespective of whether the one stabilizer control portion may be normal or abnormal, then the elastic force may be inappropriately controlled. Hence, in the case where one of the two stabilizer control portions is abnormal, it is preferred that the other stabilizer control portion be controlled according to a different control rule than the control rule used when both of the two stabilizer control portions are normal. In this case, if the control rule is changed to a different control rule appropriate for a specific sort of abnormality, then the lowering of running stability of the vehicle can be more effectively restrained than in the case where the control rule is changed to a different control rule common to different sorts of abnormalities.

(7) The stabilizer system according to any of the modes (1) to (6), wherein the stabilizer control portion is switchable to each of at least two modes selected from the group consisting of an elastic-force producing mode in which the stabilizer control portion causes the stabilizer bar to produce the elastic force corresponding to an amount of a relative movement of a left wheel and a right wheel of the vehicle in a vertical direction, a damping force producing mode in which the stabilizer control portion produces a damping force corresponding to a speed of a relative movement of a left wheel and a right wheel of the vehicle in a vertical direction, a relative-movement allowing mode in which the stabilizer control portion allows a free relative movement of a left wheel and a right wheel of the vehicle in a vertical direction, and a relative-movement restraining mode in which the stabilizer control portion restrains a relative movement of a left wheel and a right wheel of the vehicle in a vertical direction.

The stabilizer system according to this mode may be one which is switchable to each of two, three, or four modes selected from the elastic-force producing mode, the damping force producing mode, the relative-movement allowing mode, and the relative-movement restraining mode.

(8) The stabilizer system according to any of the modes (1) to (7), wherein the stabilizer control portion is switchable to each of an elastic-force producing mode in which the stabilizer control portion causes the stabilizer bar to produce the elastic force corresponding to an amount of a relative movement of a left wheel and a right wheel of the vehicle in a vertical direction, and a damping force producing mode in which the stabilizer control portion produces a damping force corresponding to a speed of a relative movement of a left wheel and a right wheel of the vehicle in a vertical direction.

(9) The stabilizer system according to any of the modes (1) to (8), wherein the stabilizer control portion comprises a hydraulic-cylinder device including a housing and a piston which is slideably fitted in the housing; and an electromagnetic control valve which is switchable to a communication position thereof in which the control valve allows a communication between two liquid chambers that are separated from each other by the piston in the housing, and a shut-off position thereof in which the control valve shuts off the communication between the two liquid chambers.

(10) The stabilizer system according to the mode (9), wherein the stabilizer control portion further comprises a flow restrictor which is provided such that the flow restrictor is located between the two liquid chambers in a state in which the electromagnetic control valve is in the communication position thereof in which the control valve allows the communication between the two liquid chambers.

(11) The stabilizer system according to the mode (9) or (10), wherein one of the housing, and a piston rod of the piston, of the hydraulic-cylinder device is connected to the stabilizer bar, and the other of the housing and the piston rod is connected to a member which is located on a side of a wheel of the vehicle.

(12) The stabilizer system according to the mode (9) or (10), wherein the stabilizer bar is separated into two portions, and wherein the housing of the hydraulic-cylinder device is connected to one of the two portions of the stabilizer bar, and a piston rod of the piston of the hydraulic-cylinder device is connected to the other portion of the stabilizer bar.

If the communication between the two liquid chambers of the hydraulic cylinder device is shut off, then the relative movement of the stabilizer bar and the wheel-side member is inhibited. Consequently the stabilizer bar is subjected to torsion because of the relative movement of left and right wheels of the vehicle in the vertical direction, and produces an elastic force corresponding to the torsion. If the communication between the two liquid chambers of the hydraulic cylinder device is allowed, then the relative movement of the stabilizer bar and the wheel-side member is allowed. Consequently the stabilizer bar is subjected to no torsion, or a small amount of torsion, if any, and produces a small elastic force, if any. In this case, if the two liquid chambers are communicated with each other via a flow restrictor, then the hydraulic cylinder device produces a damping force.

The flow restrictor may be provided in an electromagnetic control valve.

(13) The stabilizer system according to any of the modes (1) to (12), wherein the stabilizer control portion further comprises a relief valve which is provided parallel to the electromagnetic control valve and which is mechanically switched, when a liquid pressure in one of the two liquid chambers exceeds a pre-set value, from a shut-off position thereof in which the relief valve shuts off the communication between the liquid chambers, to a communication position thereof in which the relief valve allows the communication between the liquid chambers.

In the stabilizer system according to this mode, even if the electric system thereof may fail, the liquid pressure in either one of the liquid chambers of the hydraulic cylinder device can be prevented from being excessively increased, and accordingly the force exerted to the stabilizer bar can be prevented from being excessively increased.

(14) A suspension system comprising a stabilizer bar, and a stabilizer control portion which changes an elastic force of the stabilizer bar, the suspension system being characterized by further comprising:

a different control portion than the stabilizer control portion; and an abnormality-related rolling-characteristic control portion which controls, when an abnormality occurs to the stabilizer control portion, a rolling characteristic of a vehicle, by controlling the different control portion.

The above-described "different control portion" may be a second one of a plurality of stabilizer control portions which are employed by the suspension system and include the above-described stabilizer control portion as a first stabilizer control portion.

It goes without saying that the different control portion may be a different sort of control portion than a stabilizer control portion. For example, in the case where the suspension system includes a shock absorber and a valve adjusting device that can change a damping characteristic of the shock absorber, the valve adjusting device as the different control device can be controlled when an abnormality occurs to the stabilizer control portion. Thus, the rolling characteristic of the vehicle can be controlled by not the stabilizer control portion but the valve adjusting device provided for the shock absorber. This is a substitute control. More specifically described, in the case where the stabilizer control portion is abnormally fixed to the above-described elastic-force producing mode, the shock absorber may be adjusted to produce a small damping force, so as to reduce the lowering of driver's running feeling; and in the case where the stabilizer control portion is abnormally fixed to the damping-force producing mode, the shock absorber may be adjusted to produce a great damping force, so as to reduce the lowering of rolling rigidity of the vehicle. In addition, in the case where the vehicle employs front-wheel-side and rear-wheel-side stabilizer control portions, front-wheel-side and rear-wheel-side shock absorbers, and two valve adjusting devices respectively corresponding to the two shock absorbers, and an abnormality occurs to one of the two stabilizer control portions, one of the two shock absorbers that is provided in the same half portion as the half portion where the one stabilizer control portion being abnormal is located can be adjusted by the corresponding valve adjusting device, so as to control its damping force. Thus, a rolling characteristic of that half portion of the vehicle can be controlled to be equal to, or equivalent to, the rolling characteristic of the same when the one stabilizer control portion is normal. Moreover, in the case where a vehicle-body leveling device has the function of adjusting its damping characteristic, the rolling characteristic of the vehicle can be controlled by the vehicle-body leveling device.

In the case where, when an abnormality occurs to one of the front-wheel-side and rear-wheel-side stabilizer control portions, one of the two valve adjusting devices corresponding to the front-wheel-side and rear-wheel-side shock absorbers, or one of front-wheel-side and rear-wheel-side vehicle-body leveling devices, that is provided in the same half portion as the half portion where the one stabilizer control portion being abnormal is located, is appropriately controlled, it is not essentially needed to change the control rule according to which the other, normal stabilizer control portion is controlled.

The vehicle-body leveling devices may be used to adjust a posture of the vehicle. For example, if either one of the stabilizer control portions is abnormally fixed to the elastic-force producing mode, the vehicle may not be able to maintain its substantially horizontal posture, even in a state in which the vehicle is running straight. In this case, if the vehicle-body leveling devices are used to adjust respective heights of corresponding wheel-related portions of the vehicle, then the vehicle can maintain its substantially horizontal or level posture.

The suspension system according to this mode can employ any one of the technical features according to the modes (1) to (13).

(15) A steering-angle control apparatus for controlling a steering angle of at least one of a front wheel and a rear wheel, based on a state of a steering member that is operated by a driver, the steering-angle control apparatus being characterized by comprising:

a control-rule changing portion which changes, when an abnormality occurs to a stabilizer control portion which controls an elastic force of a stabilizer bar, a control rule according to which the steering angle of the at least one of the front and rear wheels is controlled.

The steering-angle control apparatus may be a rear-wheel steering-angle control apparatus (ARS) which controls a steering angle of rear wheels based on a steering angle of a steering wheel operated by a driver; or a variable-gear-ratio control apparatus (VGRS) which controls a ratio of a steering angle of front wheels to a steering angle of a steering wheel operated by a driver.

The rear-wheel steering-angle control apparatus may be one which controls a rear-wheel steering actuator to actuates the rear wheels, typically controls the actuator to steer the rear wheels by an angle determined based on an operation angle of the steering wheel and a running speed of the vehicle. When the vehicle speed is low, the actuator is controlled to steer the rear wheels in a direction opposite to the direction in which the front wheels are steered; and when the vehicle speed is high, the actuator is controlled to steer the rear wheels in a direction parallel to the direction in which the front wheels are steered.

The variable-gear-ratio control apparatus may be one which controls a gear-ratio control actuator which can control a ratio of a rotation angle of an output shaft (i.e., a piston shaft) of an electric power steering device to an operation angle of the steering wheel. For example, when the vehicle speed is high, the control apparatus makes the gear ratio greater than when the vehicle speed is low (i.e., the control apparatus makes the steering angle of the front wheels smaller than that of the rear wheels, based on the same operation angle of the steering wheel).

In a vehicle having front left and right wheels and rear left and right wheels, if an abnormality occurs to a stabilizer control portion or portions of the vehicle, a distribution of respective loads exerted to the four wheels may change for the same reason as the reason why, when an elastic force of one of two compression coil springs out of four compression coil springs that cooperate with each other to stably support four corners of a rectangular flat plate, those two coil springs being respectively located at opposite ends of one side of the rectangular plate, is increased, and the elastic force of the other coil spring is decreased, respective elastic forces of the two remaining coil springs are also changed. In addition, if the body of the vehicle is tilted because of the abnormality of the stabilizer control portion, then the load distribution on the four wheels may be changed because of the change of gravity center of the vehicle that results from the tilting of the body. In each case, if the load distribution on the four wheels is changed, the turning characteristic of the vehicle is changed. For example, the vehicle is changed to be able to turn more easily in one of the left-hand and right-hand directions and less easily in the other direction. Thus, when the stabilizer control portion is abnormal, it is preferred that the rear-wheel steering-angle control or the gear-ratio control be carried out according to a changed control rule.

For example, the changed control rule may be such that in the case where the turning direction desired by the driver is the same as the direction in which the vehicle is easier to turn, the rear wheels are steered in the opposite direction by a decreased angle, or the gear ratio is increased. On the other hand, in the case where the turning direction desired by the driver is opposite to the direction in which the vehicle is easier to turn, the rear wheels are steered in the opposite direction by an increased angle, or the gear ratio is decreased.

The steering-angle control apparatus according to this mode can employ any one of the technical features according to the modes (1) to (14).

(16) A relative-movement control apparatus for controlling a relative movement of a first member and a second member, the relative-movement control apparatus being provided between the first and second members and being switchable to a relative-movement inhibiting mode in which the relative-movement control apparatus inhibits the relative movement of the first and second members, and a damping-force producing mode in which the relative-movement control apparatus allows the relative movement of the first and second members so as to produce a damping force, the relative-movement control apparatus being characterized in that when an abnormality occurs, the relative-movement control apparatus is switched to a pre-selected one of the relative-movement inhibiting mode and the damping-force producing mode.

The relative-movement control apparatus according to this mode can employ any one of the technical features according to the modes (1) to (15).

BRIEF DESCRIPTION OF THE DRAWINGS

FIG. 3 is a map representing a control table which is stored by a memory portion of a control device of the suspension system.

FIG. 4 is a map representing another control table which is stored by the memory portion of the control device of the suspension system.

BEST MODE FOR CARRYING OUT THE INVENTION

Hereinafter, there will be described in detail, by reference to the drawings, a suspension system including a stabilizer system as one embodiment of the present invention.

Figure 1:
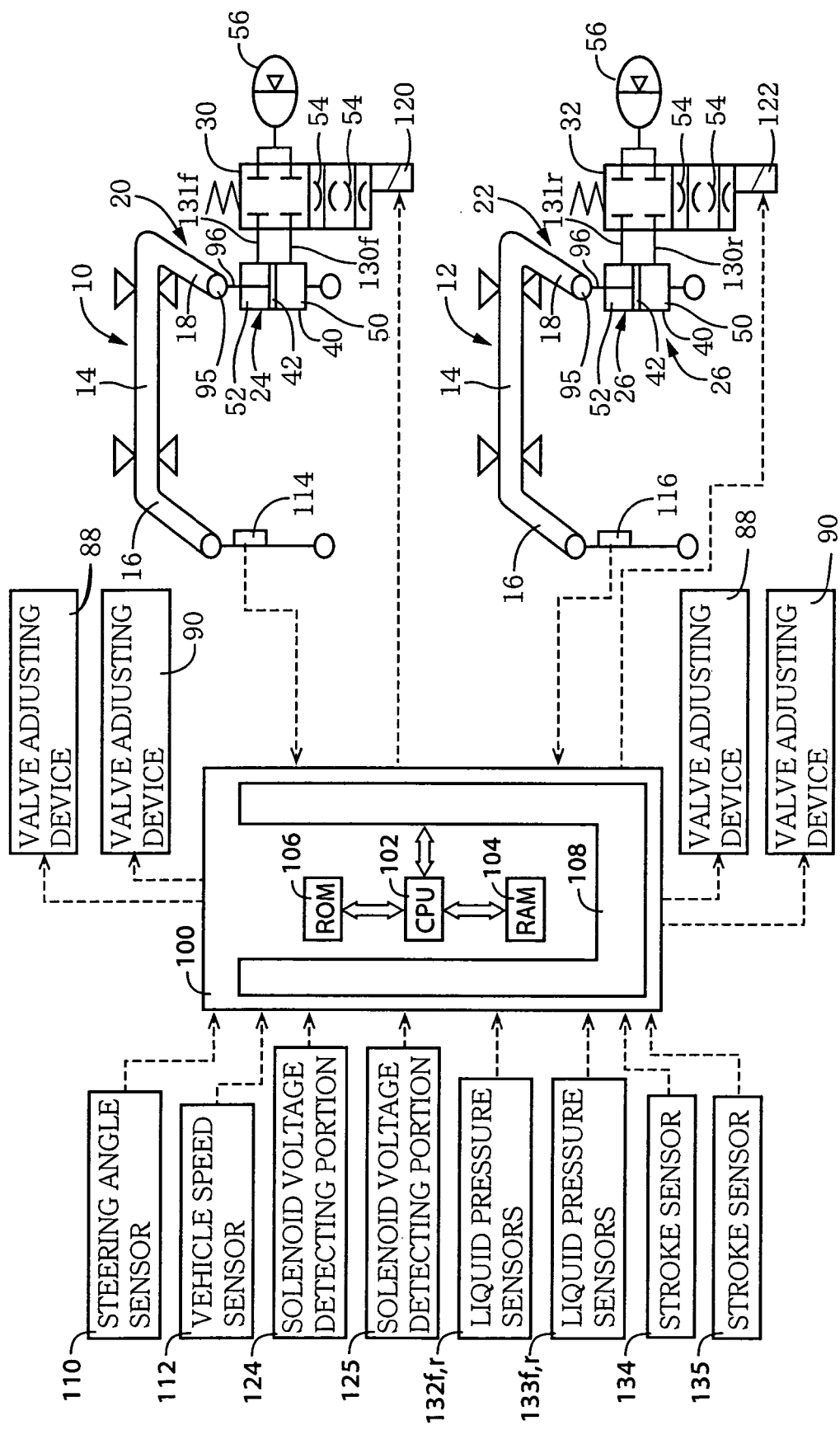
FIG. 1 is a view of a suspension system including a stabilizer system as one embodiment of the present invention.

As shown in FIG. 1, the stabilizer system of the suspension system which is for use with a vehicle and to which the present invention is applied includes a stabilizer bar 10 and a stabilizer bar 12 which correspond to front wheels and rear wheels, respectively. Each of the stabilizer bars 10, 12 has a generally U-shaped configuration, and includes an intermediate, torsion bar portion 14 which extends in a widthwise direction of the vehicle, and a left and a right rod portion 16, 18 which are integral with the torsion bar portion 14 and extend in a lengthwise direction of the vehicle.

The stabilizer system additionally includes a stabilizer control portion 20 and a stabilizer control portion 22 which correspond to the stabilizer bars 10, 12, respectively. The two stabilizer control portions 20, 22 include respective hydraulic cylinder devices 24, 26 and respective electromagnetic control valves 30, 32.

The two hydraulic cylinder devices 24, 26 are provided between the corresponding stabilizer bars 10, 12 and corresponding wheel-side members 74, respectively. Each of the two hydraulic cylinder devices 24, 26 includes a housing 40, and a piston 42 which is liquid-tightly and slideably fitted in the housing 40, and an inner room of the housing 40 is separated by the piston 42 into two liquid chambers 50, 52 between which a corresponding one of the electromagnetic control valves 30, 32 is provided.

Each of the electromagnetic control valves 30, 32 can be switched between its shut-off position in which the each control valve shuts off the communication between the two liquid chambers 50, 52, and its communication position in which the each control valve allows the communication between the two liquid chambers 50, 52 via flow restrictors 54. In the state in which each one of the control valves 30, 32 is placed in the communication position, the corresponding fluid chambers 50, 52 are communicated with an accumulator 56 which is provided for accommodating an excessive increase or decrease of a working liquid.

Figure 2:
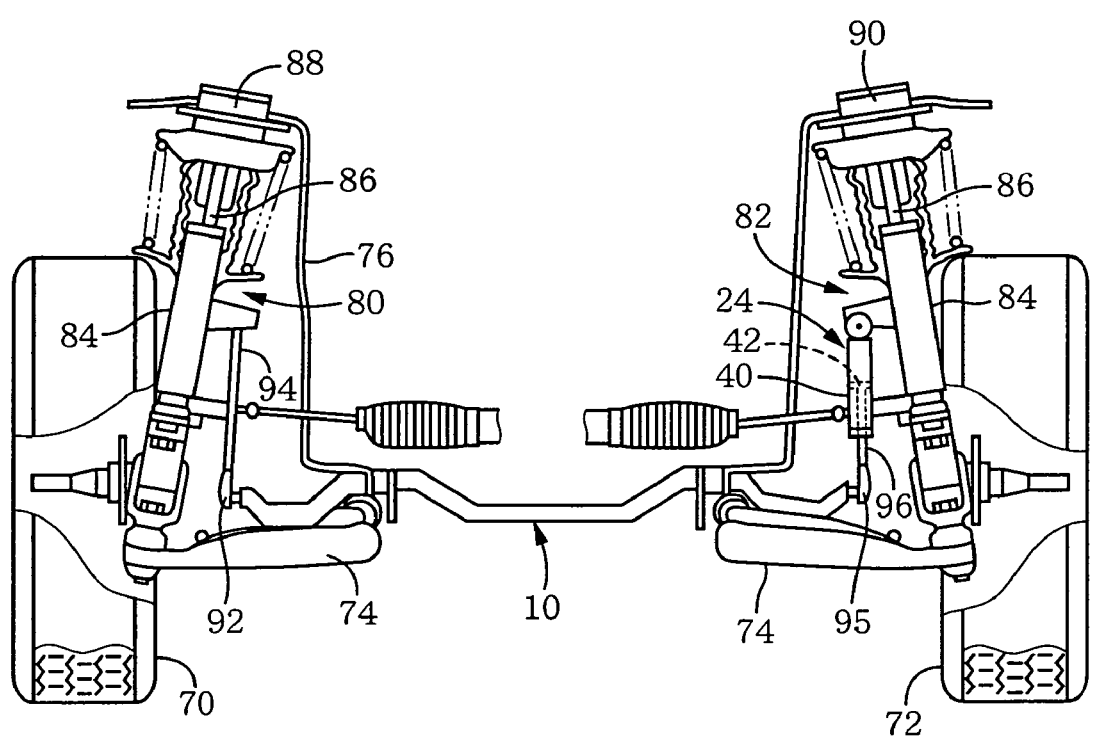
FIG. 2 is a view of a front-wheel-side portion of the suspension system.

Thus, the stabilizer system includes the stabilizer control portion 20 corresponding to the front wheels, and the stabilizer control portion 22 corresponding to the rear wheels. FIG. 2 shows a front-wheel-side portion of the suspension system that includes a front-wheel-side portion of the stabilizer system. Since a rear-wheel-side portion of the suspension system is substantially identical with the front-wheel-side portion thereof, the rear-wheel-side portion is not shown in the figures.

The suspension system shown in FIG. 2 includes, for a left wheel 70 and a right wheel 72, respective shock absorbers 80, 82 each of which is provided between the wheel-side member (i.e., an under-spring member) 74 and a vehicle-body-side member 76. In the present embodiment, each of the shock absorbers 80, 82 includes a housing 84 which is attached to the wheel-side member 74, and a piston, not shown, whose piston rod 86 is attached to the body-side member 76. When each of the shock absorbers 80, 82 is subjected to a force which causes the wheel-side member 74 and the body-side member 76 to move relative to each other in a vertical direction, the each shock absorber produces a damping force. Each shock absorber 80, 82 has an adjustable damping characteristic. More specifically described, the piston of each shock absorber 80, 82 is provided with a valve, not shown, whose degree of opening can be adjusted by a corresponding one of two valve adjusting devices 88, 90. Thus, each shock absorber 80, 82 can be selectively switched between its strong damping mode (corresponding to a high rolling rigidity) and its weak damping mode (corresponding to a low rolling rigidity, i.e., a soft running feeling of a driver).

Opposite end portions of the stabilizer bar 10 are pivotally supported by the respective wheel-side members 74 (or, the respective housings 84 of the shock absorbers 80, 82). In particular, the right-hand end portion of the stabilizer bar 10 is supported by the corresponding wheel-side member 74 via the hydraulic cylinder device 24.

More specifically described, the intermediate torsion bar portion 14 of the stabilizer bar 10 is rotatably supported by the body-side member 76, such that the torsion bar portion 14 is rotatable about its axis line, relative to the body-side member 76; and an end portion (i.e., a connection portion) 92 of the left rod portion 16 is pivotally supported by the housing 84 of the shock absorber 80 via a connection rod 94. An end portion 95 of the right rod portion 18 is pivotally connected to a piston rod 96 of the hydraulic cylinder device 24; and the housing 40 of the hydraulic cylinder device 24 is pivotally supported by the housing 84 of the shock absorber 82.

In the state in which the electromagnetic control valve 30 is placed in the communication position, if a relative movement of the left and right wheels 70, 72 occurs in the vertical direction, such a force is produced which causes the stabilizer bar 10 and the right-hand wheel-side member 74 to move relative to each other, and accordingly a difference is produced between respective liquid pressures in the two liquid chambers 50, 52. Consequently the working liquid flows from the higher pressure liquid chamber to the lower pressure liquid chamber via the flow restrictors 54, whereby a damping force is produced. This state will be referred to as the "damping-force producing mode" of the stabilizer control portion 20.

In the state in which the electromagnetic control valve 30 is placed in the closed position, if the relative movement of the left and right wheels 70, 72 in the vertical direction occurs, the relative movement of the stabilizer bar 10 and the right-hand wheel-side member 74 is inhibited, and accordingly the stabilizer bar 10 is subjected to torsion. Consequently an elastic force corresponding to an amount of torsion of the stabilizer bar 10 is produced. This state will be referred to as the "elastic-force producing mode" of the stabilizer control portion 20.

Thus, when the left and right wheels 70, 72 move in phase in the vertical direction, the stabilizer bar 10 is substantially inoperative but, when the two wheels 70, 72 move in opposite phases in the vertical direction, the stabilizer bar 10 produces the elastic force to retrain the relative movement of the wheels 70, 72 in opposite phases. The higher torsional rigidity the stabilizer bar 10 exhibits, the more the change of attitude of the vehicle when the vehicle turns is restrained (i.e., the higher rolling rigidity the vehicle exhibits); and the lower torsional rigidity the stabilizer bar 10 exhibits, the more the running feeling of the driver when the vehicle runs straight is improved.

The foregoing description of the stabilizer bar 10 corresponding to the front wheels also applies to the stabilizer bar 12 corresponding to the rear wheels.

The suspension system is controlled according to commands issued by a suspension system control device 100 that is essentially provided by a computer. The suspension system control device 100 includes a CPU 102, a memory portion including a RAM 104 and a ROM 106, and an input and output portion 108. To the input and output portion 108, the following elements are connected: a steering angle sensor 110 which detects an operation angle of a steering wheel; a vehicle speed sensor 112; two load sensors 114, 116 respectively associated with the two stabilizer bars 10, 12; two solenoid-voltage detectors 124, 125 which detect respective voltages of respective solenoids 120, 122 of the two electromagnetic control valves 30, 32; two liquid-pressure sensors 132f, 132r which detect respective liquid pressures in respective liquid passages 130f, 130r which are communicated with the respective liquid chambers 50 of the two hydraulic cylinder devices 24, 26; two liquid-pressure sensors 133f, 133r which detect respective liquid pressures in respective liquid passages 131f, 131r which are communicated with the respective liquid chambers 52 of the two hydraulic cylinder devices 24, 26; and two stroke sensors 134, 135 which detect respective strokes of the respective pistons of the two hydraulic cylinder devices 24, 26. In addition, the respective solenoids 120, 122 of the two electromagnetic control valves 30, 32, the two adjusting devices 88, 90 which adjust the two shock absorbers 80, 82 corresponding to the two front wheels, respectively, and the two adjusting devices 88, 90 which adjust the two shock absorbers 80, 82 corresponding to the two rear wheels, respectively, are connected to the input and output portion 108 via respective drive circuits, not shown.

In the present embodiment, the suspension system control device 100 estimates a lateral G indicative of a turning state of the vehicle, based on the running speed and steering angle of the vehicle and respective current conditions of the front-wheel-side and rear-wheel-side stabilizer control portions 20, 22. That is, the control device 100 can estimate a stability factor based on the respective conditions of the front-wheel-side and rear-wheel-side stabilizer control portions 20, 22, and accordingly can estimate the lateral G based on the thus estimated stability factor.

The two load sensors 114, 116 detect respective forces exerted to the two stabilizer bars 10, 12. In the present embodiment, the two load sensors 114, 116 are provided in association with the two connection rods 94, respectively, and detect, as the above-indicated forces, respective strains (or elongations) of the two connection rods 94. Those strains can be detected using respective piezoelectric elements. In this sense, the load sensors can be said as strain sensors.

Based on at least one of the respective voltages of the respective solenoids 120, 122 of the two electromagnetic control valves 30, 32, the respective liquid pressures in the respective liquid passages 130f, 130r, 131f, 131r (that are equal to the respective liquid pressures in the four liquid chambers 50, 52) that are connected to the four liquid chambers 50, 52 of the two hydraulic cylinder devices 24, 26, the respective strokes of the respective pistons of the two hydraulic cylinder devices 24, 26, and the respective forces exerted to the two stabilizer bars 10, 12, the suspension system control device 100 can judge whether each one of the front-wheel-side stabilizer control portion 20 and the rear-wheel-side stabilizer control portion 22 is being placed under an unusual, special condition. Alternatively, based on both the above-indicated at least one of the detected values, and the running condition of the vehicle, the above-indicated judgment may be made.

In the present embodiment, the suspension system control device 100 judges whether each one of the front-wheel-side stabilizer control portion 20 and the rear-wheel-side stabilizer control portion 22 cannot be changed to the elastic-force producing mode (i.e., whether each one of the front-wheel-side and rear-wheel-side stabilizer control portions 20, 22 is abnormally fixed to the damping-force producing mode), and judges whether each one of the front-wheel-side and rear-wheel-side stabilizer control portions 20, 22 cannot be changed to the damp-force producing mode (i.e., whether each one of the front-wheel-side and rear-wheel-side stabilizer control portions 20, 22 is abnormally fixed to the elastic-force producing mode). Hereinafter, each of those abnormal states will be simply referred to as the "abnormality".

Figure 5:
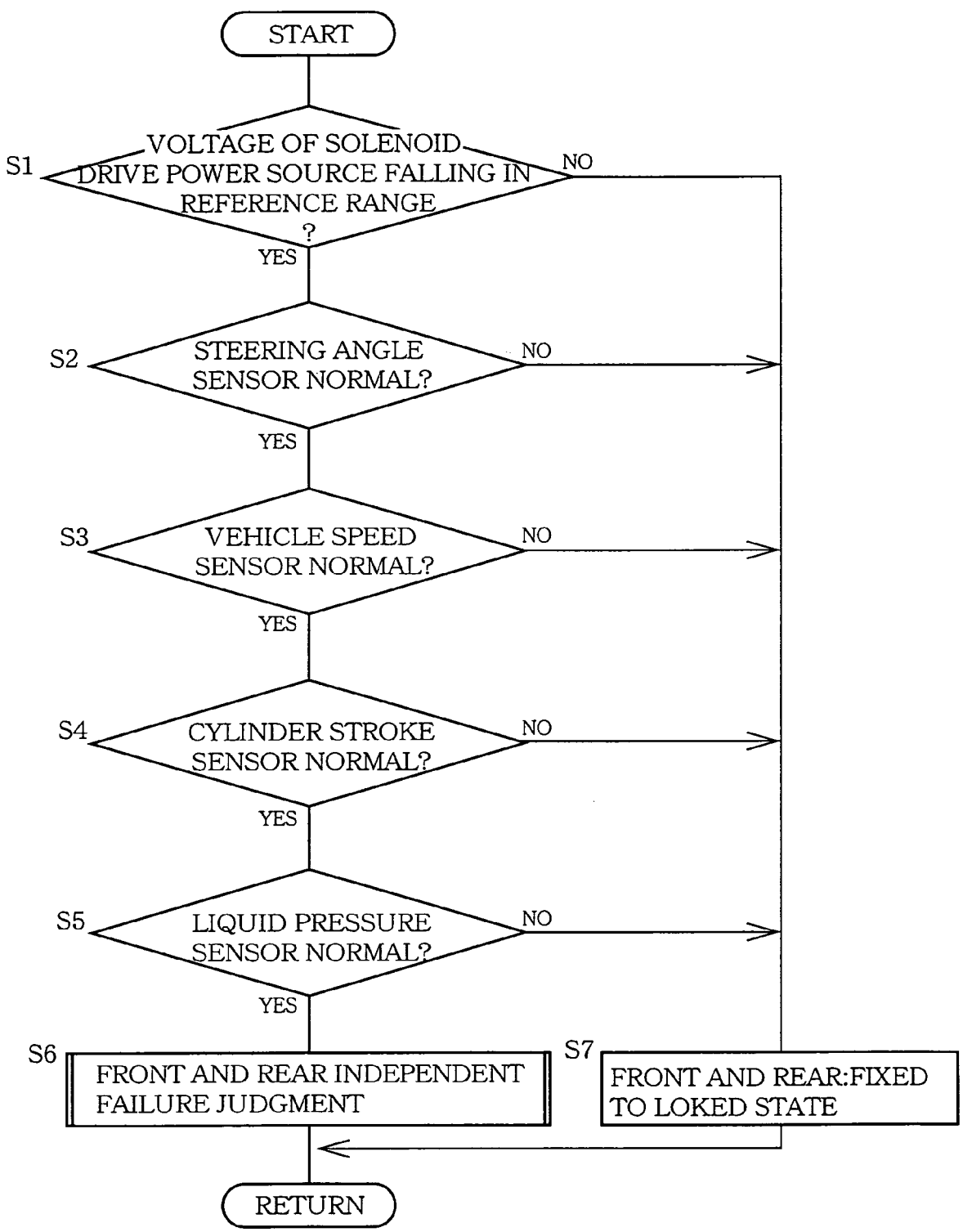
FIG. 5 is a flow chart representing a control program which is stored by the memory portion of the control device of the suspension system.
Figure 6:
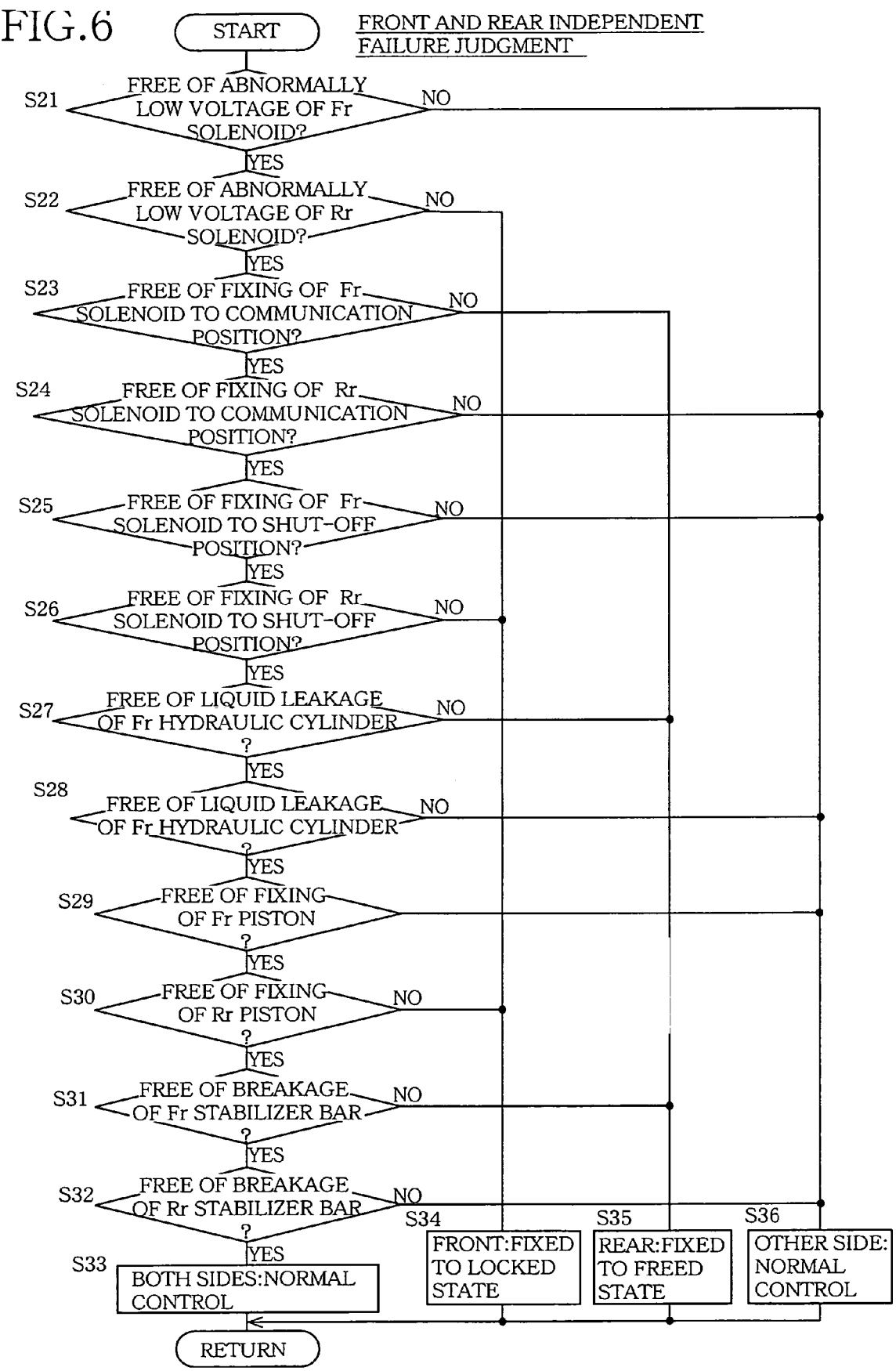
FIG. 6 is a flow chart representing a portion of the control program.
Figure 7:
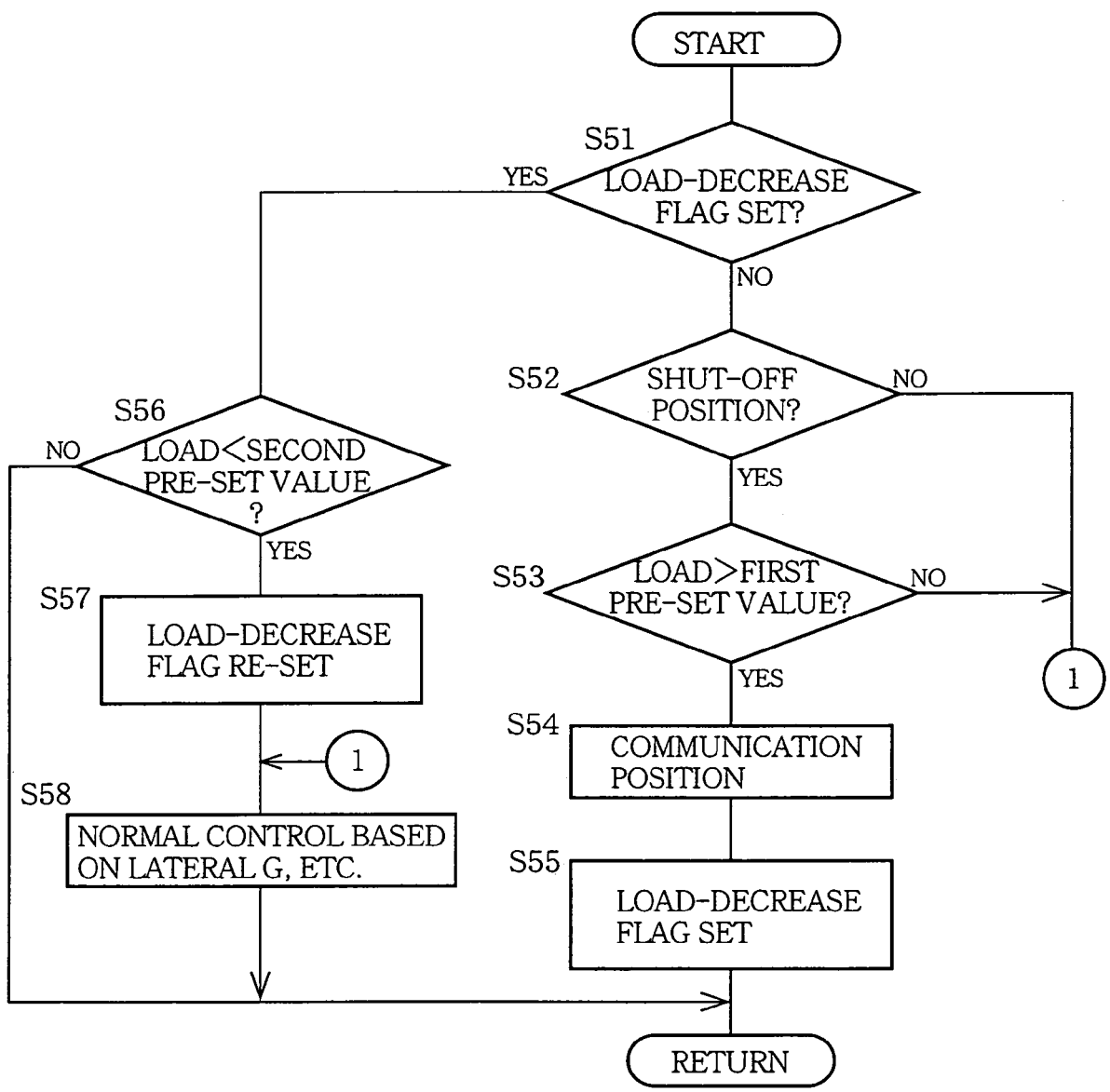
FIG. 7 is a flow chart representing another portion of the control program.

The memory portion of the suspension system control device 100 stores various control tables and programs including an in-normality control table represented by the map shown in FIG. 3; an in-abnormality control table represented by the map shown in FIG. 4; and a stabilizer control program represented by the follow charts shown in FIGS. 5, 6, and 7.

In the present embodiment, when the suspension system is initialized, the suspension system control device 100 judges whether a power source, not shown, is normal, and whether each one of the sensors is normal. If the power source is normal and all the sensors are normal, then the control device 100 judges whether each one of the front-wheel-side stabilizer control portion 20 and the rear-wheel-side stabilizer control portion 22 is normal or abnormal.

In the case where the power source is abnormal, or at least one of the sensors is abnormal, no electric current is supplied to the respective solenoids 120, 122 of the electromagnetic control valves 30, 32, so that the control valves 30, 32 are each placed in the shut-off position, and accordingly the front-wheel-side stabilizer control portion 20 and the rear-wheel-side stabilizer control portion 22 are each placed in the elastic-force producing mode. Thus, when the front-wheel-side left and right wheels 70, 72 or the rear-wheel-side left and right wheels 70, 72 move relative to each other in the vertical direction, the front-wheel-side stabilizer bar 10 or the rear-wheel-side stabilizer bar 12 is subjected to strain and produces an elastic force corresponding to the amount of strain. Thus, the rolling of the vehicle is restrained.

In the flow chart of FIG. 5, at Steps S1 through S5, the control device 100 judges whether the power source is normal, whether the steering-angle sensor 110 is normal, whether the vehicle speed sensor 112 is normal, whether each one of the stroke sensors 134, 135 is normal, and whether each one of the liquid-pressure sensors 132f, 132r, 133f, 133r is normal. In the case where the power source and all those sensors are normal, then a positive judgment, YES, is made in all those steps, and accordingly the control goes to Step S6 to judge whether each one of the front-wheel-side stabilizer control portion 20 and the rear-wheel-side stabilizer control portion 22 is normal or not and, based on the judgment result, the control device selects a control rule for controlling the two control portions 20, 22. In the case where at least one of the power source and the sensors is judged as being abnormal, then the control goes to Step S7 to select a control mode (L/L), i.e., the numerator "L" indicates an operation mode for the front-wheel-side stabilizer control portion 20 and the denominator "L" indicates an operation mode for the rear-wheel-side stabilizer control portion 22. In the present specification and drawings, "L" indicates the elastic-force producing mode; and "F" indicates the damping-force producing mode.

In the case where each of the front-wheel-side stabilizer control portion 20 and the rear-wheel-side stabilizer control portion 22 is normal, the control device 100 selects an in-normality control rule for controlling the two control portions 20, 22, i.e., selects a control mode (control/control).

In the present embodiment, when the in-normality control rule is selected, the control device 100 selects the control mode (control/control), based on a magnitude of the lateral G estimated as described above and a tendency of change of the steering angle, according to the control table shown in FIG. 3.

In the case where an absolute value of the lateral G is smaller than a pre-set value, Gy1, each of the front-wheel-side stabilizer control portion 20 and the rear-wheel-side stabilizer control portion 22 is operated in the damping-force producing mode, i.e., (F/F). Since the vehicle is running substantially straight, or is stopped, the driver enjoys a soft running or riding feeling.

In the case where an absolute value of the steering angle is increasing and the absolute value of the lateral G is not smaller than the pre-set value Gy1 and smaller than another pre-set value, Gy2, the front-wheel-side stabilizer control portion 20 is operated in the damping-force producing mode and the rear-wheel-side stabilizer control portion 22 is operated in the elastic-force producing mode, i.e., (F/L). In this control mode, the stability factor of the vehicle is small and the vehicle enjoys an excellent turning performance.

In the case where the absolute value of the lateral G is not smaller than the pre-set value Gy2 and smaller than another pre-set value, Gy3, each of the front-wheel-side stabilizer control portion 20 and the rear-wheel-side stabilizer control portion 22 is operated in the elastic-force producing mode, i.e., (L/L). In this control mode (L/L), the stability factor is greater than that in the control modes (F/L), and the vehicle enjoys an excellent running stability without sacrificing the turning performance.

When the vehicle is running in a normal state, there are very few cases in which the absolute value of the lateral G exceeds the pre-set value Gy3. In the case where the absolute value of the steering angle is decreasing, for example, when the turning of the vehicle ends, if the absolute value of the lateral G is decreasing below the pre-set value Gy2, then the front-wheel-side stabilizer control portion 20 is operated in the elastic-force producing mode and the rear-wheel-side stabilizer control portion 22 is operated in the damping-force producing mode, i.e., (L/F). In this control mode (L/F), the stability factor of the vehicle is greater than that in the control mode (F/L), and the tendency of under-steering is great.

In the case where the absolute value of the lateral G is not smaller than the pre-set value Gy3, then the front-wheel-side stabilizer control portion 20 is operated in the elastic-force producing mode and the rear-wheel-side stabilizer control portion 22 is operated in the damping-force producing mode, i.e., (L/F), so as to increase the tendency of under-steering. Even if subsequently the absolute value of the steering angle changes to be decreasing and the absolute value of the lateral G is decreasing below the pre-set value Gy3, this control mode is maintained. Thus, when the turning of the vehicle is ending, the tendency of under-steering is increased and accordingly the driver enjoys an improved turning-end feeling.

On the other hand, in the case where an abnormality of the front-wheel-side stabilizer control portion 20 or the rear-wheel-side stabilizer control portion 22 is detected, the control device 100 selects a control rule corresponding to the abnormality.

As indicated in the map shown in FIG. 4, in the case where the front-wheel-side stabilizer control portion 20 is abnormally fixed to the damping-force producing mode, that is, the control portion 20 cannot be switched to the elastic-force producing mode, the control device 100 fixes the rear-wheel-side stabilizer control portion 22 to the damping-force producing mode. If the rear-wheel-side stabilizer control portion 22 is normal, the control portion 22 can be switched to either the damping-force producing mode or the elastic-force producing mode, based on the running condition of the vehicle. However, in the state in which the front-wheel-side stabilizer control portion 20 is abnormally fixed to the damping-force producing mode, if the rear-wheel-side stabilizer control portion 22 is switched to the elastic-force producing mode, the stability factor of the vehicle would decrease and the tendency of over-steering would increase. To solve this problem, if the rear-wheel-side stabilizer control portion 22 is abnormally fixed to the damping-force producing mode, the tendency of over-steering is avoided and the running stability of the vehicle is improved. Thus, this control mode is equivalent to the above-explained control mode (F/F).

If the control device 100 detects, regarding the front-wheel-side stabilizer control portion 20, that the electromagnetic control valve 30 is abnormally fixed, because of a mechanical abnormality, to the communication position (i.e., that the control valve 30 cannot be switched to the shut-off position), that some working liquid has leaked from the hydraulic cylinder device 24, or that the stabilizer bar 10 has broken, the control device judges that the control portion 20 cannot be switched to the elastic-force producing mode. In the case where some working liquid leaks from the liquid chambers 50, 52, the liquid chambers 50, 52 cannot produce a sufficiently high liquid pressure and accordingly the stabilizer bar 10 cannot produce a sufficiently great elastic force. In the case where the stabilizer bar 10 has broken, the bar 10 cannot produce a sufficiently great elastic force, either.

The failure that the electromagnetic control valve 30 is abnormally fixed to the communication position, can be detected by detecting a movement of the piston 42 after the supplying of electric current to the solenoid 120 is stopped. The leakage of working liquid from the hydraulic cylinder device 24 can be detected based on the respective liquid pressures in the liquid passages 130f, 131f. If each liquid pressure is lower than a pre-set value (e.g., around an atmospheric pressure) in the state in which the electromagnetic control valve 30 is in the shut-off position, the control device 100 can judge that the leakage of the working liquid has occurred. The liquid-pressure sensors 132, 133 may be replaced with ones which directly detect the respective liquid pressures in the liquid chambers 50, 52. The breakage of the stabilizer bar 10 can be detected based on the load detected by the load sensor 114. For example, in the case where the load detected by the load sensor 114 does not exceed a pre-set value in the state in which the electromagnetic valve 30 is in the shut-off position, the control device can judge that the stabilizer bar 10 has broken. Alternatively, the control device may be modified to find the breakage of the stabilizer bar 10 when a detected amount of torsion of the torsion bar portion 14 of the stabilizer bar 10 is greater than a pre-set value.

In the case where the rear-wheel-side stabilizer control portion 22 is abnormally fixed to the damping-force producing mode (that is, the control portion 22 cannot be switched to the elastic-force producing mode), the control device 100 controls the front-wheel-side stabilizer control portion 20, based on the lateral G and the tendency of change of steering angle, according to the in-normality control table, because in this case the vehicle can maintain an excellent running stability irrespective of whether the front-wheel-side stabilizer control portion 20 is in either the damping-force producing mode or the elastic-force producing mode. This is a control mode (control/F). The failure that the rear-wheel-side stabilizer control portion 22 is abnormally fixed to the damping-force producing mode, can be detected in the same manner as described above with respect to the detection of the failure that the front-wheel-side stabilizer control portion 20 is abnormally fixed to the damping-force producing mode.

In the case where the rear-wheel-side stabilizer control portion 22 is abnormally fixed to the elastic-force producing mode (that is, the control portion 22 cannot be switched to the damping-force producing mode), the control device 100 also fixes the front-wheel-side stabilizer control portion 20 to the elastic-force producing mode. This control mode is equivalent to the above-explained control mode (L/L).

When the control device 100 detects, regarding the rear-wheel-side stabilizer control portion 22, that no electric current is supplied to the solenoid 122 of the electromagnetic control valve 32 (because of, e.g., breakage of wire), that the voltage of the solenoid 122 is abnormally low, that the electromagnetic control valve 32 is fixed to the shut-off position because of a mechanical abnormality, or that the piston 42 of the hydraulic cylinder device 26 is abnormally fixed, the control device can judge that the control portion 22 is abnormally fixed to the damping-force producing mode. The abnormal fixing of the piston 42 can be detected by detecting that the stroke of the piston 42 does not change for more than a pre-set time.

The electric voltage or electric current of the solenoid 122 of the electromagnetic control valve 32 is detected by, e.g., the voltage detecting portion 125. The failure that the control valve 32 is abnormally fixed to the shut-off position, can be detected when the stroke of the piston 42 cannot be detected though the electric current is supplied to the solenoid 122.

In the case where the front-wheel-side stabilizer control portion 20 is abnormally fixed to the elastic-force producing mode (that is, the control portion 20 cannot be switched to the damping-force producing mode), the control device 100 controls the rear-wheel-side stabilizer control portion 22 according to the in-normality control table. This is a control mode (L/control). The failure that the front-wheel-side stabilizer control portion 20 is abnormally fixed to the elastic-force producing mode, can be detected in the same manner as described above with respect to the detection of the failure that the rear-wheel-side stabilizer control portion 22 is abnormally fixed to the elastic-force producing mode.

In the stabilizer control program represented by the flow chart of FIG. 6, at Steps 21 through 32, the control device 100 reads in the respective values detected by the sensors, and judges whether the front-wheel-side stabilizer control portion 20 or the rear-wheel-side stabilizer control portion 22 is abnormally fixed to the damping-force producing mode (i.e., the control portion 20, 22 cannot be switched to the elastic-force producing mode), or the elastic-force producing mode (i.e., the control portion 20, 22 cannot be switched to the damping-force producing mode).

In the case where both the front-wheel-side stabilizer control portion 20 and the rear-wheel-side stabilizer control portion 22 are normal, the control device 100 selects, at Step S33, the control mode (control/control).

In the case where the rear-wheel-side stabilizer control portion 22 is abnormally fixed to the elastic-force producing mode, the control device 100 fixes, at Step S34, the front-wheel-side stabilizer control portion 20 to the elastic-force producing mode, i.e., selects the control mode (L/L).

In the case where the front-wheel-side stabilizer control portion 20 is abnormally fixed to the damping-force producing mode, the control device 100 fixes, at Step S35, the rear-wheel-side stabilizer control portion 22 to the damping-force producing mode, i.e., selects the control mode (F/F).

In the case where either the front-wheel-side stabilizer control portion 20 is abnormally fixed to the elastic-force producing mode, or the rear-wheel-side stabilizer control portion 22 is abnormally fixed to the damping-force producing mode, the control device controls, at Step S36, the normal, other stabilizer control portion according to the in-normality control table, i.e., selects either the control mode (L/control) or the control mode (control/F).

If the rear-wheel-side stabilizer control portion 22 is abnormally fixed to the elastic-force producing mode, a positive judgment YES is obtained at Step S22, S26, or S30. More specifically described, the failure that the voltage of the solenoid 122 of the electromagnetic control valve 32 is abnormally low (Step S22), the failure that the control valve 32 is fixed to the shut-off (i.e., closed) position because of, e.g., a mechanical abnormality (Step S26), or the failure that the piston 42 of the hydraulic cylinder device 26 is abnormally fixed (Step S30) is found. Hence, the control goes to Step S34 to fix the front-wheel-side stabilizer control portion 20 to the elastic-force producing mode, i.e., selects the control mode (L/L).

If the front-wheel-side stabilizer control portion 20 is abnormally fixed to the damping-force producing mode, a positive judgment YES is obtained at Step S23, S27, or S31. Hence, the control goes to Step S35 to select the control mode (F/F). More specifically described, the failure that the electromagnetic control valve 32 is abnormally fixed to the communication (i.e., opened) position (Step S23), the failure that the working liquid has leaked from the hydraulic cylinder device 24 (Step S27), or the failure that the stabilizer bar 10 has broken (Step S31) is found.

In the other cases than the above-explained cases, the control device 100 controls the normal, other stabilizer control portion according to the in-normality control table.

In the front-wheel-side stabilizer control portion 20, if the voltage of the solenoid 120 of the electromagnetic control valve 30 has lowered (Step S21), if the control valve 30 is abnormally fixed to the shut-off position (Step S25), or if the piston 42 of the hydraulic cylinder 24 is abnormally fixed (Step S29), then the control device 100 judges that the front-wheel-side stabilizer control portion 20 is abnormally fixed to the elastic-force producing mode (i.e., that the control portion 20 cannot be switched to the damping-force producing mode). In this case, the control goes to Step S36 to select the control mode (L/control). Thus, the control device 100 controls the rear-wheel-side stabilizer control portion 22 according to the in-normality control table.

Regarding the rear-wheel-side stabilizer control portion 22, if the electromagnetic control valve 32 is abnormally fixed to the communication position (Step S24), if the working liquid has leaked from the hydraulic cylinder 26 (Step S28), or if the stabilizer bar. 12 has broken (Step S32), then the control device 100 judges that the rear-wheel-side stabilizer control portion 22 is abnormally fixed to the damping-force producing mode (i.e., that the control portion 22 cannot be switched to the elastic-force producing mode). In this case, the control goes to Step S36 to select the control mode (control/L). Thus, the control device 100 controls the front-wheel-side stabilizer control portion 20 according to the in-normality control table.

Thus, in the present embodiment in which the two stabilizer control portions 20, 22 are respectively provided in the front-wheel-side and rear-wheel-side half portions of the vehicle, if an abnormality occurs to either one of the two stabilizer control portions 20, 22, the control device 100 controls the other stabilizer control portion 20, 22 according to the nature of the abnormality. Thus, the control device 100 can appropriately control the stabilizer control portions 20, 22 upon detection of each abnormality, and can prevent the lowering of the running stability of the vehicle.

In the present embodiment, while both the front-wheel-side stabilizer control portion 20 and the rear-wheel-side stabilizer control portion 22 are normal, the control device 100 monitors the forces exerted to the stabilizer bars 10, 20. If each one of the electromagnetic control valves 30, 32 is in the shut-off position and the load exerted to a corresponding one of the stabilizer bars 10, 20 exceeds the pre-set value, then the each control valve 30, 32 is switched to the communication position. That is, the each control valve 30, 32 is switched from the elastic-force producing mode to the damping-force producing mode, and the elastic force produced by the corresponding stabilizer bar 10, 20 is decreased. Thus, the force exerted to each stabilizer bar 10, 20 can be prevented from being excessively increased, and accordingly each of the stabilizer bars 10, 20 can be prevented from being broken.

When each stabilizer bar 10, 12 is designed, if the bar 10, 12 is given a high rigidity, then the bar 10, 12 is given a low allowable stress. That is, it is difficult to design a stabilizer bar having a high rigidity and a high allowable stress. Hence, when the load exerted to each of the stabilizer bars 10, 12 exceeds the pre-set value, the corresponding one of the electromagnetic control valves 30, 32 is switched to the communication position, so that the each bar 10, 12 may not receive a stress greater than the allowable stress. Thus, the pre-set value may be determined based on the allowable stress of each stabilizer bar 10, 12.

The routine represented by the flow chart shown in FIG. 7 is carried out while the above-described control mode (control/control) is set. This control routine is carried out on each one of the front-wheel-side stabilizer control portion 20 and the rear-wheel-side stabilizer control portion 22, independent of each other. If each one of the electromagnetic control valves 30, 32 is in the shut-off position, and the load exerted to the corresponding one of the stabilizer bars 10, 12 exceeds a pre-set value (i.e., a first pre-set value) (i.e., if respective positive judgments YES are obtained at Steps S52 and S53), the control goes to Step S54 to switch the each control valve 30, 32 to the communication position, and then goes to Step S55 to set a load-decrease flag.

While the load-decrease flag is set, and the load exerted to the one stabilizer bar 10, 12 is not smaller than a second pre-set value (i.e., a positive judgment YES is obtained at Step S51 and a negative judgment NO is obtained at Step S56), the each stabilizer control portion 20, 22 remains in the damping-force producing mode.

Subsequently, when the load exerted to the one stabilizer bar 10, 12 is decreased to a value smaller than the second pre-set value, a positive judgment is obtained at Step S56, and the control goes to Step S57 to re-set the load-decrease flag, and then goes to Step S58 to control the each stabilizer control portion 20, 22 according to the in-normality control routine, i.e., the in-normality control table, represented by the map shown in FIG. 3, in which, e.g., the lateral G is used.

Thus, if the load exerted to each one of the stabilizer bars 10, 12 exceeds the pre-set value (i.e., if the each stabilizer bar 10, 12 is placed under a special condition), the stabilizer control portion 20, 22 corresponding to the each stabilizer bar 10, 12 is switched to the damping-force producing mode. In this case, the stabilizer control portion 20, 22 itself is not under the abnormal condition, and accordingly that stabilizer control portion can be controlled according to a changed control rule. Thus, each of the stabilizer bars 10, 12 can be prevented from being broken. In addition, since the control routine employs a hysteresis, each of the electromagnetic control valves 30, 32 can be prevented from being too frequently switched between the communication position and the shut-off position.

At any rate, if the stabilizer system is placed under an unusual, special condition, the stabilizer control portion or portions 20, 22 is or are controlled according to a special control rule corresponding to the nature of the special condition. That is, under the special condition, the controlling of the stabilizer control portion or portions 20, 22 is not inhibited but is continued. In addition, since the in-normality control rule is changed to an appropriate one of different special control rules corresponding to respective natures of different special conditions, the stabilizer control portion or portions 20, 22 is or are controlled more appropriately than in the case where the stabilizer control portion or portions 20, 22 is or are controlled according to a single special control rule. Thus, under each of the special conditions, the running stability of the vehicle can be prevented from lowering.

In the illustrated embodiment, in the case where either one of the front-wheel-side stabilizer control portion 20 and the rear-wheel-side stabilizer control portion 22 is abnormal, the other, normal stabilizer control portion is controlled according to a changed control rule corresponding to the nature of the abnormality. However, in addition to the other stabilizer control portion, the respective damping characteristics of the shock absorbers 80, 82 may be controlled.

For example, in the case where either one of the front-wheel-side stabilizer control portion 20 and the rear-wheel-side stabilizer control portion 22 is abnormally fixed to the damping-force producing mode, it is possible to control the respective valve adjusting devices 88, 90 for the shock absorbers 80, 82 corresponding to the one stabilizer control portion 20, 22, and thereby strengthen the respective damping characteristics of the shock absorbers 80, 82. Thus, even if each one of the stabilizer bars 10, 12 may not be able to produce a sufficiently great elastic force, the vehicle can enjoy a sufficiently great rolling rigidity.

On the other hand, in the case where either one of the front-wheel-side stabilizer control portion 20 and the rear-wheel-side stabilizer control portion 22 is abnormally fixed to the elastic-force producing mode, it is possible to control the respective valve adjusting devices 88, 90 for the shock absorbers 80, 82 corresponding to the one stabilizer control portion 20, 22, and thereby weaken the respective damping characteristics of the shock absorbers 80, 82. Thus, the lowering of riding comfort of the driver can be avoided.

Meanwhile, in the case where one of the two stabilizer control portions 20, 22 is abnormal, it is possible to control the respective damping characteristics of the two shock absorbers 80, 82 corresponding to the one stabilizer control portion, without changing the control rule according to which the other, normal stabilizer control portion is currently controlled. That is, in place of the controlling of the elastic force by the other stabilizer control portion, the respective damping characteristics of the two shock absorbers 80, 82 corresponding to the one stabilizer control portion are controlled so as to control the rolling rigidity of the vehicle. Thus, this control can be said a substitute control.

Figure 8:
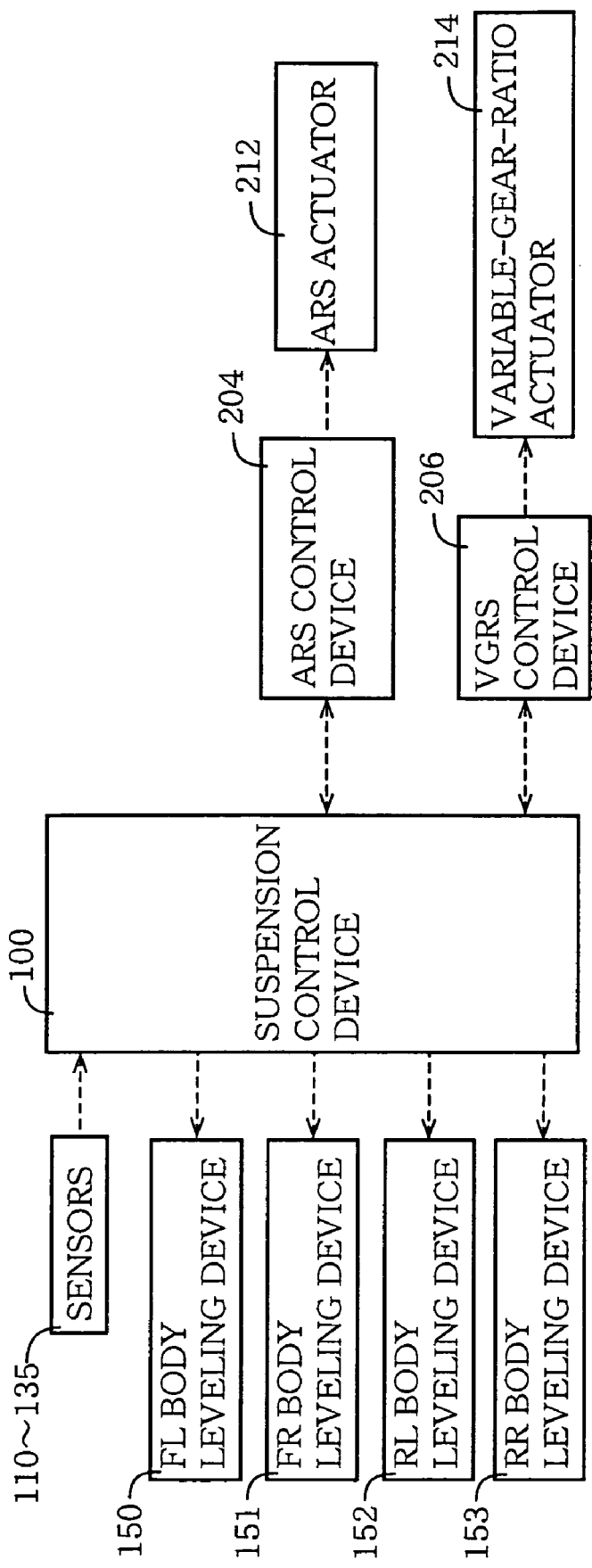
FIG. 8 is a view showing a control device of another suspension system including another stabilizer system as another embodiment of the present invention, and peripheral devices of the control device.

The present invention is also applicable to another suspension system which additionally includes respective body leveling devices corresponding to four wheels of a vehicle. In this case, when an abnormality occurs to a stabilizer control portion or portions, the body leveling devices may be controlled. This embodiment is shown in FIG. 8. In this embodiment, body leveling devices 150, 151, 152, 153 are controlled according to commands supplied from a suspension control device 100.

For example, in the case where the stabilizer control portion 20, 22 is abnormally fixed to the elastic-force producing mode, a posture of the vehicle may be tilted even when the vehicle runs straight (i.e., may be deviated from a neutral posture). In this case, if the respective body leveling devices 150 to 153 corresponding to the four wheels are controlled independent of each other, the tilting of the posture of the vehicle can be corrected to a substantially horizontal posture.

In the case where respective damping characteristics of the body leveling devices 150 to 153 are adjustable, it is possible to control the respective damping characteristics of the body leveling devices 150 to 153 in the same manner as described above in connection with the shock absorbers 80, 82.

It is preferred that a rear-wheel steering-angle control operation and/or a variable-gear-ratio control operation be carried out in consideration of whether the stabilizer control portion 20, 22 is normal or is abnormally fixed to the elastic-force producing mode. That is, is preferred that a control rule used for the rear-wheel steering-angle control operation or the variable-gear-ratio control operation be changed to another control rule when the stabilizer control portion is abnormally fixed to the elastic-force producing mode.

In the present embodiment, to the suspension control device 100, there are connected a rear-wheel steering-angle (ARS) control apparatus 204 and a variable-gear-ratio (VGRS) control apparatus 206, and the control device 100 sends, by communication to each of the control devices 204, 206, information indicating that the stabilizer control portion 20, 22 is abnormally fixed to the elastic-force producing mode.

The rear-wheel steering-angle control device 204 is for controlling a rear-wheel steering (ARS) actuator 212 which actuates the rear wheels, such that the actuator 212 steers the rear wheels by an angle determined based on an operation angle of the steering wheel and the running speed of the vehicle. For example, when the vehicle speed is low, the actuator 212 steers the rear wheels in a direction opposite to the direction in which the front wheels are steered; and when the vehicle speed is high, the actuator 212 steers the rear wheels in a direction parallel to the direction in which the front wheels are steered. The variable-gear-ratio control device. 206 is for controlling a variable-gear-ratio actuator 214 which can vary a ratio of a rotation angle of an output shaft (i.e., a piston shaft) of an electric power steering device to an operation angle of the steering wheel. For example, when the vehicle speed is high, the actuator 214 provides a greater gear ratio than a gear ratio when the vehicle speed is low (i.e., the actuator 214 provides a smaller steering angle of the front wheels than the steering angle of the rear wheels, based on the same operation angle of the steering wheel).

In a vehicle having four wheels, i.e., front left and right wheels and rear left and right wheels, if an abnormality occurs to a stabilizer control portion or portions 20, 22 of the vehicle, a distribution of respective loads exerted to the four wheels may be changed for the same reason as the reason why, when an elastic force of one of two compression coil springs out of four compression coil springs that cooperate with each other to stably support four corners of a rectangular flat plate, those two coil springs being respectively located at opposite ends of one side of the rectangular plate, is increased, and the elastic force of the other coil spring is decreased, respective elastic forces of the other, two coil springs are also changed. In addition, if the body of the vehicle is tilted because of the abnormality of the stabilizer control portion, then the load distribution on the four wheels may be changed because of the change of gravity center of the vehicle that results from the tilting of the body. In each case, if the load distribution on the four wheels is changed, the turning characteristic of the vehicle is also changed.

For example, the vehicle is changed to be able to turn more easily in one of the left- and right-hand directions and less easily in the other direction. Thus, when the stabilizer control portion 20, 22 is abnormal, it is preferred that the rear-wheel steering-angle control operation or the gear-ratio control operation be carried out according to a changed control rule.

For example, the rear-wheel steering-angle control operation may be carried out such that in the case where a turning direction desired by the driver is the same as the direction in which the vehicle is easier to turn, the rear wheels are not steered in an opposite direction, or are steered in the opposite direction by a decreased angle. On the other hand, in the case where the turning direction desired by the driver is opposite to the direction in which the vehicle is easier to turn, the rear wheels may be steered by an increased angle. Likewise, the variable-gear-ratio control operation may be carried out such that in the case where the turning direction desired by the driver is the same as the direction in which the vehicle is easier to turn, the gear ratio is increased; and in the case where the turning direction desired by the driver is opposite to the direction in which the vehicle is easier to turn, the gear ratio is decreased.

In the case where the vehicle which employs the present suspension system or the present steering-angle control apparatus is capable of carrying out a slip control (i.e., a traction control or an anti-lock control) or a vehicle stability control, the lowering of the running stability of the vehicle can be more effectively restrained.

In a slip control system which controls respective braking forces so that respective slips of wheels are controlled in a pre-set manner, respective slip ratios of the wheels may be detected, and respective braking forces applied to the wheels may be controlled independent of each other, so that the slip ratio of each wheel is maintained at a pre-set value. Therefore, even if the load distribution on the wheels may be changed because of the abnormality of the stabilizer control portion 20, 22, the braking forces can be controlled independent of the change of the load distribution. Therefore, in the vehicle capable of carrying out the traction control or the anti-lock control, even if the load distribution on the wheels may be changed because of the abnormality of the stabilizer control portion, the slipping of each wheel can be likewise prevented. Thus, the lowering of the running stability of the vehicle, resulting from the slipping of each wheel, can be effectively avoided.

In the vehicle capable of carrying out the vehicle stability control, the lowering of the running stability of the vehicle, resulting from the change of the load distribution on the wheels because of the abnormality of the stabilizer control portion, can be directly avoided by the vehicle stability control.

In the illustrated embodiments, the respective loads exerted to the stabilizer bars 10, 12 are detected by the respective load sensors 114, 116 supported by the connection rods 94. However, the load sensors 114, 116 may be supported by the stabilizer bars 10, 12. For example, each load sensor 114, 116 may be supported by the left-hand or right-hand rod portion 16, 18, and may detect the force based on the amount of elastic deformation of the rod portion 16, 18. Alternatively, each load sensor 114, 116 may be supported by the torsion bar portion 14 and may detect the force based on the amount of torsion of the bar portion 14.

The force exerted to each of the two stabilizer bars 10, 12 can be determined based on the respective liquid pressures in the liquid chambers 50, 52 of a corresponding one of the hydraulic cylinder devices 24, 26 (those liquid pressures are detected by the liquid-pressure sensors $132f$, $133f$, $132r$, $133r$). It can be estimated that the higher the liquid pressure in either one of the liquid chambers 50, 52 is, the greater the force exerted to the each stabilizer bar 10, 12 is. In the illustrated embodiment, the liquid chambers 50, 52 of each of the hydraulic cylinder devices 24, 26 are associated with the respective liquid-pressure sensors. Therefore, even if the vehicle may be kept in a tilted posture, the control device 100 can detect whether the load exerted to each of the stabilizer bars 10, 12 is greater than the pre-set value. However, it is possible to associate only one of the liquid chambers 50, 52 with a liquid-pressure sensor, because, in a state in which the vehicle oscillates in a rolling direction, the respective liquid pressures in both the liquid chambers 50, 52 are increased. In this case, it is preferred to associate the liquid chamber 52 with a liquid-pressure sensor, because, since the piston rod 96 is provided in the liquid chamber 52, the liquid pressure in the liquid chamber 52 is higher than that in the liquid chamber 50.

Figure 9:
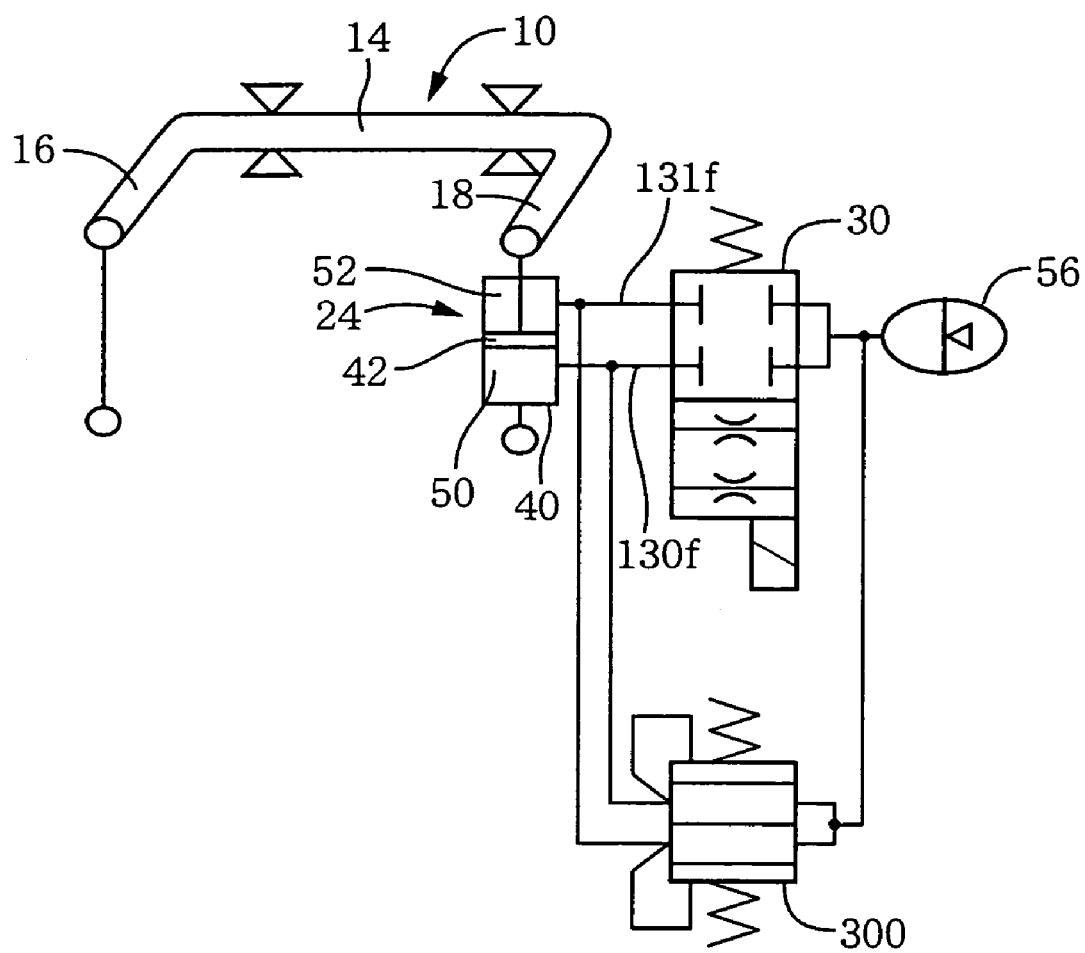
FIG. 9 is a view of another stabilizer system as another embodiment of the present invention.

As shown in FIG. 9, it is possible to provide, between each of the hydraulic cylinder device 24 and the hydraulic cylinder device 26, and a corresponding one of the accumulators 56, a relief valve 300 that is parallel to a corresponding one of the electromagnetic control valve 30 and the electromagnetic control valve 32. The relief valve 300 is normally placed in a shut-off position in which the relief valve 300 shuts off the communication between the two liquid chambers 50, 52 of the each hydraulic cylinder device 24, 26. When the liquid pressure in one of the two liquid chambers 50, 52 becomes higher than that in the other liquid chamber by more than a pre-set value, the relief valve 300 is switched to a communication position in which the relief valve 300 allows the communication between the two liquid chambers 50, 52. Thus, the two liquid chambers 50, 52 communicate with each other without the intervention of the flow restrictors 54.

If, in the state in which each one of the electromagnetic control valves 30, 32 is in the shut-off position, the liquid pressure in one of the two liquid chambers 50, 52 thereof tends to be excessively high, those liquid chambers 50, 52 are communicated with each other via the relief valve 300. Thus, the liquid pressure can be prevented from being excessively increased, and the elastic force of a corresponding one of the stabilizer bars 10, 12 can be decreased. Thus, when an electric system of the vehicle fails, or when each one of the electromagnetic control valves 30, 32 is abnormally fixed to the shut-off position, the force exerted to a corresponding one of the stabilizer bars 10, 12 can be avoided from being excessively increased. The relieve valves 300 are designed such that in the state in which each one of the electromagnetic control valves 30, 32 is in its communication position, a corresponding one of the relief valves 300 cannot be switched to its communication position.

In each of the illustrated embodiments, the stabilizer control portions 20, 22 are each switchable between the elastic-force producing mode and the damping-force producing mode, and include the respective hydraulic cylinder devices 24, 26. However, the stabilizer control portions 20, 22 may be modified in various manners.

For example, the hydraulic cylinder devices 24, 26 may be replaced with rotary cylinder devices. In addition, the stabilizer control portions may be ones each of which includes a rotary damper incorporating a restrictor, and an electromagnetic control valve that is switchable between a communication position in which the control valve allows communication between two chambers and a shut-off position in which the control valve shuts off the communication. Moreover, the stabilizer control portions may be ones each of which is switchable between an elastic-force producing mode and a relative-movement allowing mode in which a relative movement of left and right wheels in a vertical direction is allowed. In this case, each of the stabilizer control portions may employ an electromagnetic control valve that is switchable between a shut-off position in which the control valve shuts off the communication between the two liquid chambers 50, 52 and a communication position in which the control valve allows the communication therebetween without the intervention of a flow restrictor. Furthermore, the stabilizer control portions may be ones each of which is operable in a relative-movement restraining mode in which the each control portion can control, in the state in which the communication between the two liquid chambers 50, 52 is shut off, the liquid pressure in either one of the liquid chambers 50, 52, to such a value which assures that a relative movement of left and right wheels in a vertical direction is restrained. That is, the stabilizer control portions may be ones each of which is switchable to each of at least two modes arbitrarily selected from the elastic-force producing mode, the relative-movement allowing mode, the damping-force producing mode, and the relative-movement restraining mode. Also, the stabilizer control portions may be ones each of which employs an electromagnetic actuator that can directly control the rigidity of a corresponding one of the stabilizer bars 10, 12.

In each of the illustrated embodiments, each of the electromagnetic control valves 30, 32 remains in the shut-off position while no electric current is supplied to a corresponding one of the solenoids 120, 122. However, it is possible to employ electromagnetic control valves each of which remains in its communication position while no electric current is supplied to a corresponding one of solenoids 120, 122 thereof. In this case, when electric voltages of the solenoids 120, 122 abnormally lower, or when an electric system fails, those control valves are each placed in the communication position.

The in-normality control rule used for controlling the stabilizer control portions 20, 22 may be modified in various manners. For example, the information indicating the running condition of the vehicle may include, in addition to the lateral G, a yaw rate and/or a steering angle. Moreover, it is possible to take, into consideration, an air pressure in each wheel, whether the vehicle is running on a bad or good road, etc., in addition to the running condition of the vehicle.

Abnormality of each of the stabilizer control portions 20, 22 may be detected based on a value detected by a vehicle-body level sensor, a yaw rate sensor, or a rolling rate sensor. When the current mode of each of the stabilizer control portions does not correspond to the detected value, the control device 100 can judge that the each stabilizer control portion is abnormal.

It is to be understood that the present invention may be embodied with various changes and improvements, such as those described in DISCLOSURE OF THE INVENTION, that may occur to a person skilled in the art.

The invention claimed is:

1. A stabilizer system, comprising:
   a stabilizer bar;
   a stabilizer control portion which corresponds to the stabilizer bar and is controllable, based on a running condition of a vehicle, to control an elastic force of the stabilizer bar; and
   a control-rule changing portion which changes a control rule when the stabilizer system is brought into an unusual, special state, wherein:
   the control-rule changing portion comprises a force-related changing portion, and
   the stabilizer system is brought into said unusual special state when a force exerted to the stabilizer bar has exceeded a pre-set value that is unusually great and corresponds to an allowable stress of the stabilizer bar.

2. The stabilizer system according to claim 1, wherein the control-rule changing portion further comprises a force detecting portion which detects the force exerted to the stabilizer bar.

3. A stabilizer system, comprising:
   a stabilizer bar;
   a stabilizer control portion which corresponds to the stabilizer bar and is controllable, based on a running condition of a vehicle, to control an elastic force of the stabilizer bar; and
   a control-rule changing portion which changes a control rule when the stabilizer system is brought into an unusual, special state, wherein: the control-rule changing portion comprises an elastic-force decreasing portion,
   the stabilizer system is brought into said unusual special state when a force exerted to the stabilizer bar has exceeded a first pre-set value, and
   according to the changed control rule, the stabilizer control portion is initially controlled, independent of the running condition of the vehicle, to decrease the elastic force of the stabilizer bar to a value that is smaller than the elastic force when the force exerted to the stabilizer bar exceeded the first pre-set value.

4. The stabilizer system according to claim 3, wherein the control-rule changing portion further comprises a force detecting portion which detects the force exerted to the stabilizer bar.

5. The stabilizer system according to claim 3, wherein the stabilizer control portion comprises:
   a hydraulic-cylinder device including a housing and a piston which is slideably fitted in the housing; and an electromagnetic control valve which is switchable to a communication position thereof in which the control valve allows a communication between two liquid chambers that are separated from each other by the piston in the housing, and a shut-off position thereof in which the control valve shuts off the communication between the two liquid chambers.

6. The stabilizer system according to claim 5, wherein the stabilizer control portion further comprises a relief valve which is provided parallel to the electromagnetic control valve and which is mechanically switched, when a liquid pressure in one of the two liquid chambers exceeds a second pre-set value, from a shut-off position thereof in which the relief valve shuts off the communication between the liquid chambers, to a communication position thereof in which the relief valve allows the communication between the liquid chambers.

7. A stabilizer system, comprising:
a plurality of stabilizer bars;
a plurality of stabilizer control portions including (a) a first stabilizer control portion which controls a first stabilizer bar of the plurality of stabilizer bars and does not control any other stabilizer bar of the plurality of stabilizer bars, and (b) a second stabilizer control portion which controls a second stabilizer bar of the plurality of stabilizer bars and does not control the first stabilizer bar, wherein the first stabilizer control portion is controllable, based on a running condition of a vehicle, to control an elastic force of the first stabilizer bar and not to control an elastic force of any other stabilizer bar, and the second stabilizer control portion is controllable, based on the running condition of the vehicle, to control an elastic force of the second stabilizer bar and not to control the elastic force of the first stabilizer bar; and
an abnormality-related control-rule changing portion which changes a control rule when an abnormality occurs to one of the first and second stabilizer control portions, wherein:
the control rule that is changed is for the other of the first and second stabilizer control portions and the changed control rule corresponds to the abnormality.

8. The stabilizer system according to claim 7, wherein each of the stabilizer control portions is switchable to each of at least two modes selected from the group consisting of an elastic-force producing mode in which said each stabilizer control portion causes a corresponding one of the stabilizer bars to produce the elastic force corresponding to an amount of a relative movement of a left wheel and a right wheel of the vehicle in a vertical direction, a damping force producing mode in which said each stabilizer control portion produces a damping force corresponding to a speed of a relative movement of a left wheel and a right wheel of the vehicle in a vertical direction, a relative-movement allowing mode in which said each stabilizer control portion allows a free relative movement of a left wheel and a right wheel of the vehicle in a vertical direction, and a relative-movement restraining mode in which said each stabilizer control portion restrains a relative movement of a left wheel and a right wheel of the vehicle in a vertical direction.

9. The stabilizer system according to claim 7, wherein each of the stabilizer control portions is switchable to each of an elastic-force producing mode in which said each stabilizer control portion causes a corresponding one of the stabilizer bars to produce the elastic force corresponding to an amount of a relative movement of a left wheel and a right wheel of the vehicle in a vertical direction, and a damping force producing mode in which said each stabilizer control portion produces a damping force corresponding to a speed of a relative movement of a left wheel and a right wheel of the vehicle in a vertical direction.

10. The stabilizer system according to claim 7, wherein each of the stabilizer control portions comprises:
a hydraulic-cylinder device including a housing and a piston which is slideably fitted in the housing; and
an electromagnetic control valve which is switchable to a communication position thereof in which the control valve allows a communication between two liquid chambers that are separated from each other by the piston in the housing, and a shut-off position thereof in which the control valve shuts off the communication between the two liquid chambers.

11. The stabilizer system according to claim 10, wherein said each stabilizer control portion further comprises a flow restrictor which is provided such that the flow restrictor is located between the two liquid chambers in a state in which the electromagnetic control valve is in the communication position thereof in which the control valve allows the communication between the two liquid chambers.

12. The stabilizer system according to claim 10, wherein one of the housing, and a piston rod of the piston, of the hydraulic-cylinder device of said each stabilizer control portion is connected to a corresponding one of the stabilizer bars, and the other of the housing and the piston rod is connected to a member which is located on a side of a wheel of the vehicle.

13. The stabilizer system according to claim 10, wherein said each stabilizer control portion further comprises a relief valve which is provided parallel to the electromagnetic control valve and which is mechanically switched, when a liquid pressure in one of the two liquid chambers exceeds a pre-set value, from a shut-off position thereof in which the relief valve shuts off the communication between the liquid chambers, to a communication position thereof in which the relief valve allows the communication between the liquid chambers.

14. The stabilizer system according to claim 7, wherein the abnormality-related control-rule changing portion comprises:
an abnormality-nature identifying portion which identifies a nature of the abnormality; and
an abnormality-nature-related changing portion which changes the control rule, such that the changed control rule corresponds to the nature identified by the abnormality-nature identifying portion.

15. A stabilizer system comprising:
a stabilizer bar;
a stabilizer control portion which corresponds to the stabilizer bar and is controllable, based on a running condition of a vehicle, to control an elastic force of the stabilizer bar; and a control-rule changing portion which changes, when the stabilizer system is brought into an unusual, special state, a control rule according to which the stabilizer control portion is controlled,
wherein the control-rule changing portion comprises a force-related changing portion which changes the control rule when the stabilizer system is brought into said unusual special state in which a force exerted to the stabilizer bar has exceeded a first pre-set value that is unusually great,
wherein the stabilizer control portion comprises:
a hydraulic-cylinder device including a housing and a piston which is slideably fitted in the housing; and
an electromagnetic control valve which is switchable to a communication position thereof in which the control valve allows a communication between two liquid chambers that are separated from each other by the piston in the housing, and a shut-off position thereof in which the control valve shuts off the communication between the two liquid chambers.

16. The stabilizer system according to claim 15, wherein the stabilizer control portion further comprises a relief valve which is provided parallel to the electromagnetic control valve and which is mechanically switched, when a liquid pressure in one of the two liquid chambers exceeds a second pre-set value, from a shut-off position thereof in which the relief valve shuts off the communication between the liquid chambers, to a communication position thereof in which the relief valve allows the communication between the liquid chambers.

17. The stabilizer system according to claim 15, wherein the stabilizer control portion further comprises at least one liquid-pressure sensor which detects a liquid pressure in at least one of the two liquid chambers of the housing, and the stabilizer control portion determines, based on the liquid pressure detected by said at least one liquid-pressure sensor, the force exerted to the stabilizer bar.

* * * * *